No. 49,052. PATENTED JULY 25, 1865.
H. BESSEMER.
MANUFACTURE OF IRON AND STEEL.
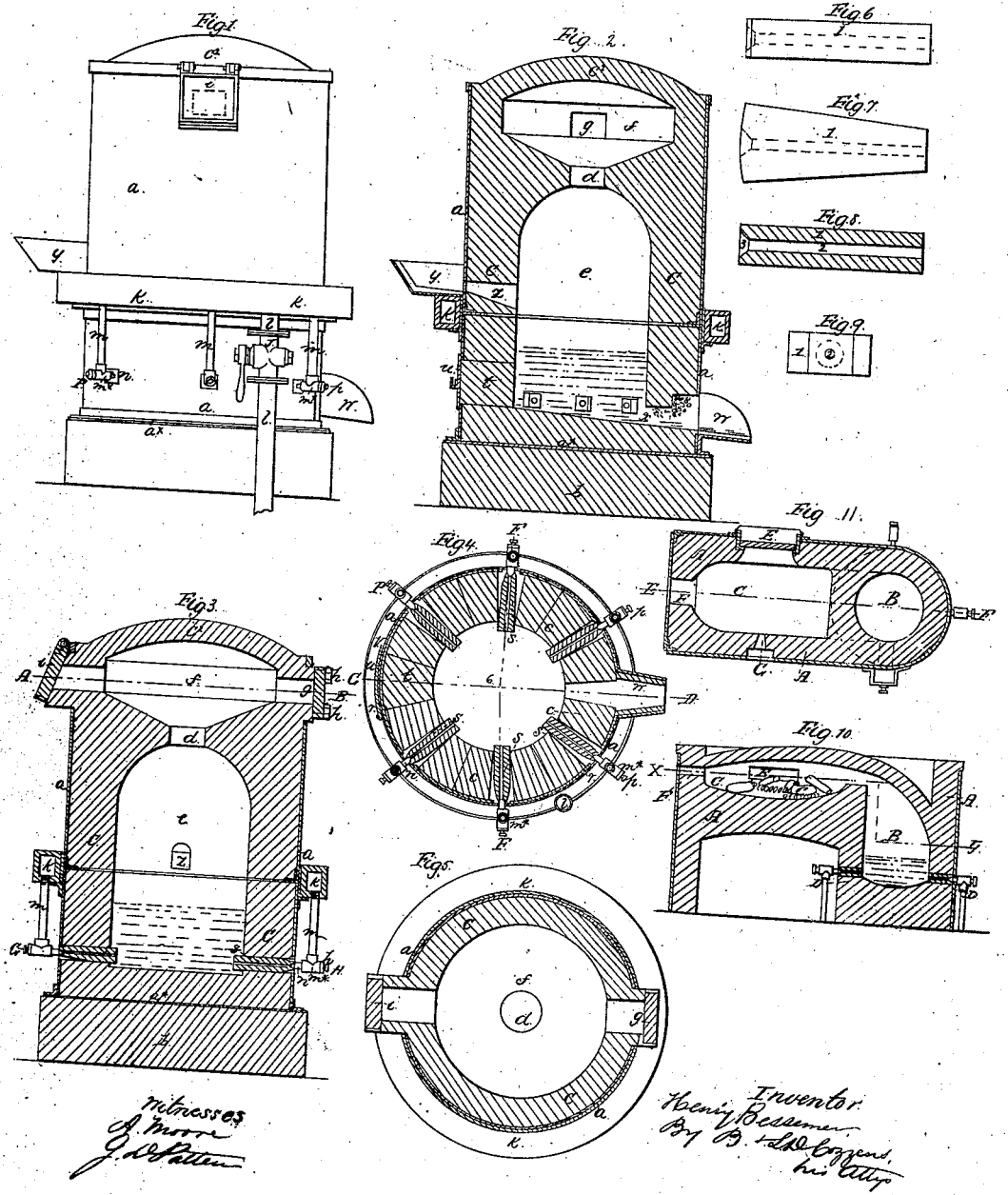

UNITED STATES PATENT OFFICE.

HY. BESSEMER, OF LONDON, ENGLAND.

IMPROVEMENT IN THE MANUFACTURE OF IRON AND STEEL.

Specification forming part of Letters Patent No. 49,052, dated July 25, 1865.

*To all whom it may concern:*

Be it known that I, HENRY BESSEMER, of Queen Street Place, New Cannon Street, in the city of London, in the Kingdom of Great Britain, have invented certain new and useful Improvements in the Manufacture of Iron and Steel; and I do hereby declare the following to be a full and exact description of the same, reference being had to the accompanying drawings.

In carrying into practical operation the manufacture of malleable iron and steel by forcing atmospheric air or steam into and among the particles of fluid crude iron, for which patents in the United States have already been granted to me, I have discovered that certain modifications of and additions to the apparatus and process therein described may be advantageously used, and the adaptation of which improvements to the manufacture of iron and steel forms the subject of my present invention.

These improvements may thus be generally described: first, heating or melting pig-iron or other metals in a suitable furnace by the heat given off in the process of converting crude fluid iron into malleable iron or steel by streams of air or steam; second, alloying iron or steel with other metals by mixing said alloys with iron or steel during the process of said conversion from crude fluid iron; third, blowing powdered metals, alloys, or fluxes into molten iron by means of the currents of air or steam used to decarbonize the said molten iron.

To enable others skilled in the art to more fully understand and construct and use my invention, I have hereto annexed a sheet of drawings on which the same is represented, and a more complete description of the process.

Figure 1 is an elevation of one form of my apparatus; Fig. 2, a vertical section taken on the line C D of Fig. 4. Fig. 3 is a vertical section taken on the line F F of Fig. 4. Fig. 4 is a horizontal section on the line G H of Fig. 3, and Fig. 5 is a horizontal section taken on the line A B of Fig. 3.

The outer cylindrical shell or vessel, $a$, is made of iron plates riveted to the bottom plate, $a^*$, which rests on the brick foundation $b$.

Making a joint between two parts of a converting-vessel above the level of the charge of fluid metal, as shown on the line $k\,k$ of Fig. 3, I do not claim in this application for Letters Patent; but I have claimed such division of the vessel in another application.

The vessel is lined with fire-bricks $c$, which I prefer to make of a segmental form, so as to facilitate the relining of the vessel when necessary; fire-stone may, however, be used in lieu thereof, and in either case the lining may be protected from the action of the heat and fluid materials by a coating of loam, sand, or such other matters as are generally employed to line up the interior of furnaces.

By reference to Figs. 2 and 3 it will be observed that the lining $c$ is brought over so as to form an arch or dome, leaving the throat or passage $d$ to form a communication between the converting-chamber $e$ and the heating or melting chamber $f$, the form of which chamber $f$ may be greatly varied. In the drawings the floor of this chamber $f$ is shown to be sloped downward to the center, in order to facilitate the running of any fluid iron that may be remelted there by the great heat of the converting process or be thrown from the converting-chamber below by the upward current of flame and gases. In forming the bottom of this or a like second chamber of a converting-vessel provision may be made to retain any metal which may be melted therein from flowing into the converting-vessel below till such fluid metal is tapped and allowed to flow through a suitable opening or openings previously kept closed. By thus combining a second compartment with a converting vessel or apparatus the great heat evolved by the converting process (when no fuel is used) will be most beneficially employed in heating and melting the metal put into such heating-chamber, and the heat produced in this peculiar converting process will be economized and advantageously employed.

The chamber $f$ is covered by the crown $C^2$, and is provided with an opening on one side for the introduction of ingot ends or other waste or scrap metal, and is closed, when desired, by the door $g$, which consists of an iron frame having a fire-tile fitted therein and provided with hinges $h$. The chamber $f$ has another opening, to which is fitted a damper-plate, $i$, hung on horizontal hinges, the mouth of the opening projecting forward more at the lower part than above, so that the damper-plate may lie against it after the manner of a clack-valve.

The plate $i$ may be made of iron; but I prefer using a fire-tile held in an iron frame, as represented in the drawings.

Around the exterior of the vessel is an iron chamber or pipe, $k$, resting on an angle-iron riveted to the vessel $a$ and extending entirely around it. A pipe, $l$, is connected thereto for the purpose of supplying air or steam whenever the cock $j$ is opened.

Into the under side of the chamber $k$, I screw the vertical blast-pipes $m$, each of which has a T-piece at $m^*$, through the horizontal part of which a sliding tube, $n$, is fitted. It is made conical at its outer end, so as to fit a conical recess made in the end of the tuyeres $s$. The other end of the tube $n$ is pressed on by a spiral spring (contained in the piece $m^*$) in order to keep it in close contact with the tuyere. A small screw-plug, $p$, is fitted to one end of the piece $m^*$, for the purpose of admitting a plug or rod for the purpose of clearing out the tuyere should it become obstructed when in use.

By reference to Fig. 4 it will be seen that the tuyere-pipes $s$ are inserted in the spaces left between the segmental lining-bricks $c$, and that they are tapered off toward their outer ends, so as to leave a space for a packing of loam, $r$, around them, square holes being left in the cylinder $a$ in order to admit of their removal when worn out and of their being replaced by others while the vessel is still in a heated state.

An opening at $t$ is made in the vessel for the purpose of removing any remnants of fuel that may be left in it after the preliminary heating of the vessel. This opening is secured by a stopper, $t'$, composed of fire-brick, clay, or loam, and held in place by an iron plate, $u$, having a bar across the outside of it, which is held there by hooks $v$ attached to the vessel $a$.

A spout, $w$, lined with loam, is provided for the running out of the fluid malleable iron or steel when the stopping of sand at $x$ is removed. The mode I prefer of stopping the tapping-hole $x$ is simply to ram it in with loam, as commonly practiced in cupola-furnaces used for remelting iron.

At $y$, I form a spout lined with loam for the purpose of receiving the stream of molten metal as it flows from the blast or other furnace, the opening $z$ allowing it to flow from thence into the chamber $e$.

In using this form of apparatus for obtaining steel or malleable iron, a fire is first made in the chamber $e$ in order to dry or heat the lining $c$. Such parts of the fuel as may not have been consumed in so doing is then raked out at the opening $t$, which is again closed and secured. A blast of air or steam from a suitable blast-engine or steam-boiler is then allowed to pass through the cock $j$ into the channel $k$, and from thence, by means of the pipes $m$ and tuyeres $s$, into the lower part of the chamber $e$. Molten crude iron from the smelting-furnace, or remelted pig or refined iron, is then allowed to flow into the chamber $e$ through the opening $z$, which may be then practically closed by placing a piece of brick against the exterior of the hole. The blast of air or steam, either separate or mixed, will be forced into and among the particles of fluid iron, and by its action thereon the carbon mechanically or chemically combined therewith will unite with the oxygen of the air or decomposed steam and increase the temperature of the metal, and drive off so much of the impurities contained in the iron as to bring it to a malleable condition, without, however, allowing the metal to solidify, and hence the iron or steel so produced may be run off in a fluid state from the tap-hole $x$ and formed into ingots; and here I would observe that, although I have mentioned air and steam because they contain or are capable of evolving oxygen at a cheap rate, it will nevertheless be understood that pure oxygen gas, or a mixture thereof with air or steam, may be used; and so likewise any fluid or solid matter containing or capable of evolving oxygen may be used in conjunction with air or steam in the process of converting crude iron into malleable iron or steel in vessels or chambers in which fuel is not used for the purpose of keeping up the heat of the metal. I would, however, remark that the use of such matters in addition to air or steam is not new or claimed by me under the present Letters Patent. If solid matters containing or capable of evolving oxygen be employed in this manner, I prefer to introduce such matters by the door $g$, and allow them to occupy the upper chamber, $f$, until they are brought to a high temperature, and I then push them through the opening $d$ into the chamber below. In this way the various oxides of iron may be used to assist decarbonization in my improved apparatus.

In some cases I make a portion of the segmental bricks which form the lower part of the lining of the vessel with holes in them, in lieu of using the pipes before named, in which case I make them of fire-stone, fire-clay, or of plumbago, or such a mixture of fire-clay and plumbago as is used for making crucibles. When these perforated bricks are used I make the iron shell or vessel so as to separate at the part where they are inserted, in order to afford facility for their removal when worn out.

The crude metal is to be run into the vessel through a hole made in one side for that purpose, and after the completion of the process it is drawn off through a tap-hole secured by loam, similar to the tap-holes used in the ordinary cupola-furnace.

The shape of the perforated segmental bricks before described will be understood by reference to the sheet of drawings hereunto annexed, where Fig. 6 is a side elevation of one of them; Fig. 7 a plan, Fig. 8 a longitudinal section, and Fig. 9 an end view, of the same.

1 represents the brick; 2, the tuyere-hole, with an enlarged conical orifice, 3, which receives the end of the blast-pipe.

When fire-stone, plumbago, or other natural substance in a solid form is used, the hole or tuyere-passage may be formed by boring.

As soon as a charge of crude iron is run into the vessel a workman will put into the upper chamber the quantity of bar ends, ingot ends, or other metal or cast or wrought iron in any form intended to be mixed with the charge. He should place these pieces so as to be acted upon by the heat and flame issuing from the throat of the vessel. Toward the close of the operation, and after the metal has attained a very high temperature, the workman will open the door of the upper chamber, and with a hook-tool he will bring the pieces of iron or steel over the throat of the lower chamber, into which they will fall, and be there rapidly melted and mixed with the remainder of the charge and be converted into malleable iron or steel, and may then be cast into ingots in the manner before described.

In the conversion of crude into malleable metal by forcing air or steam therein, a portion of the fluid scoria formed in the process is carried upward with the gaseous matters and flame and is expelled from beneath the damper-plate $i$, which, however, serves to prevent the too easy egress of these matters, and thus assists in retaining the necessarily high temperature of the contents of the vessel. Should, however, an accumulation of hardened scoria at any time obstruct the egress of flame from beneath the damper-plate, the opening must be cleared by a workman using a suitable iron rod.

In the treatment of different irons by the process of forcing atmospheric or other oxygen therein, it will be found advantageous in some cases to use such fluxes as will best act upon the different bases associated with the iron. In this way small quantities of lime, silica, or alumina may be added with advantage; and so in like manner chloride of sodium, iron scales, oxide of manganese, and other salts or fluxes may be used to assist in the separation of the impurities contained in the crude metal, as have before been used for like purposes, and the application of the same is not claimed by me under the present Letters Patent. These fluxes, or any of them that it may be found necessary to use when treating iron in my improved apparatus, may be introduced into the metal in the form of powder at the tuyeres by allowing such powders to fall from a close vessel gradually into the blast-pipes, so that they be blown in with currents of air or steam, and be thus made to act direct upon the fluid metal; or, in lieu of this mode of introducing the fluxes, they may be put in at the feeding-door and be allowed to fall through the opening $d$ before or during the continuation of the process; and, further, when it is desired to make any alloy of zinc, copper, silver, or other metals with iron or steel, I put such metals, in a fluid or solid state, or as salts or oxides, into the chamber or vessel before described, where their mixture with the molten iron or steel will be greatly facilitated by the violent agitation which is produced by the forcing in of the air or steam, and which continues during the discharge of the metal from the vessel, so that no time is allowed for subsidence or separation of the alloy should the chemical affinities of the metals for each other be so weak as to have a tendency to separate when left in a state of repose.

When employing fluid metal for alloying with malleable iron or steel, I pour it through an opening in the converting-vessel, so that it may fall direct into the fluid mass below; but when employing metal in a solid form, I put it into the upper chamber through the door $g$ and allow it to acquire a high temperature, after which it may be pushed with a rod through the opening $d$ into fluid iron or steel; and when using salts or oxides of metals for the purpose of producing an alloy or mixture with the iron or steel, I prefer to introduce such salts or oxides in the form of powder at the tuyeres, or to put them into the vessel previous to running in the fluid metal.

I would observe that I am aware that zinc, copper, silver, and other metals have before been combined with iron and steel otherwise manufactured. I therefore make no general claim thereto.

As soon as the metal has arrived at the condition which the workman judges suitable for his purpose, he will proceed to tap the furnace and discharge the metal therefrom and form it into ingots or other castings.

In the process of making malleable iron and steel by the forcing of oxygen into the fluid metal, I have found that the heat evolved may be advantageously applied to the remelting of pig-iron by the means already described, or by allowing such waste heat to enter a reverberatory arch or chamber built in immediate connection with the converting-vessel, in which arch the pigs of iron may be so placed as to be exposed to the full action of the heated matters which escape from the converting-vessel. The iron so melted may be afterward rendered malleable by running it into the converting-vessel and there forcing into it currents of gaseous oxygen, as before described, so that the waste heat of one converting operation may be made available for the remelting of the crude iron required for the next; or the waste heat may be applied to a suitably-constructed boiler for the purpose of generating steam to be used for the production of motive power, or for other purposes in the manufacture of iron and steel.

Another apparatus suitable for carrying into practical operation the remelting of iron by the waste heat of the converting process is represented in Figs. 10 and 11 of the annexed sheet of drawings, Fig. 10 being a vertical section on the line E F of Fig. 11, and Fig. 11 is a horizontal section taken on the line X Y of Fig. 10.

A represents a mass of brick-work inclosed within or strapped together with iron. At one end is formed the converting-vessel B, having an arched roof, so made as to reverberate the flame and heated gases onto the hearth of the melting-chamber C. The converting-chamber is provided with tuyeres D in the usual way, and with proper openings for the reception of and for the discharge of the metal therefrom. Previous to running the first charge of metal into the converting-vessel, the pig-iron intended to form the next charge is introduced through the door E into the chamber C, and as soon as the blast is introduced through the tuyeres into the molten metal in the converting-vessel the flame and heated gases arising therefrom will be reverberated upon the pigs of iron in the chamber C and melt them, the flame finally escaping by the opening F. After the completion of the process the metal in the chamber C may be run off at the opening G, and may be converted into iron or steel without the use of the fuel that would otherwise have been required for the purpose of melting the metal.

I do not necessarily confine myself to the precise arrangement of parts herein shown, and details not herein laid down may be carried out in any manner known to the art, and which may be found applicable to my invention.

Having thus described my invention, the following is what I claim as new therein and desire to secure by Letters Patent—

1. The use of the double chambers, substantially as described, for treating iron, or alloys, or fluxes, for the purposes specified.

2. Heating or melting pig-iron or other metals in a reverberatory furnace or other suitable vessel by the heat given off when streams or jets of air or steam are forced through fluid crude iron in the process of converting such fluid crude iron into malleable iron or steel, substantially as described.

3. Alloying iron or steel with other metals by mixing such other metals with the iron or steel during the process of converting said iron or steel from crude iron by currents of air or steam.

4. Blowing powdered metals, or oxides of metals, or alloys or fluxes, into molten iron by means of the currents of air or steam used to decarbonize the said molten iron, substantially in the manner described.

HENRY BESSEMER.

Witnesses:
A. L. HOLLEY,
DAVD. LONGSDON.